Feb. 28, 1956  A. A. DROS  2,736,488
ENGINE-UNIT CONSISTING OF AT LEAST ONE WORKING
CYLINDER AND AT LEAST ONE COMPRESSOR CYLINDER
Filed Aug. 13, 1952  6 Sheets-Sheet 1

INVENTOR
ALBERT A. DROS
BY  Jemon and Palmer
ATTORNEYS

Feb. 28, 1956  A. A. DROS  2,736,488
ENGINE-UNIT CONSISTING OF AT LEAST ONE WORKING
CYLINDER AND AT LEAST ONE COMPRESSOR CYLINDER
Filed Aug. 13, 1952  6 Sheets-Sheet 2
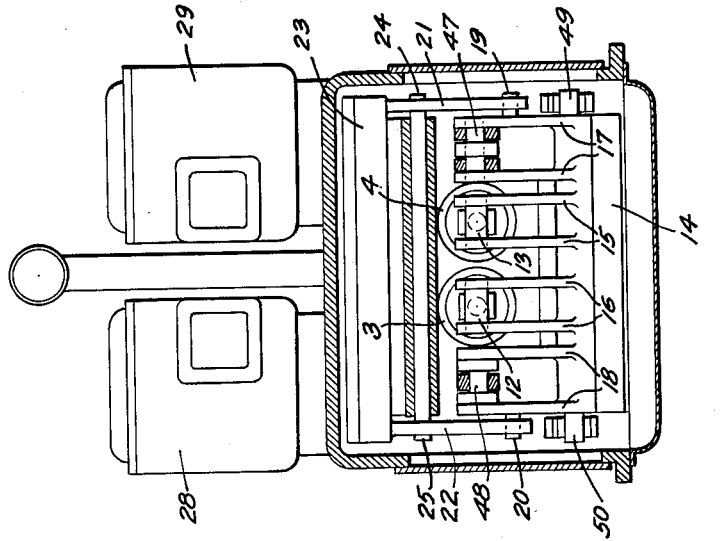
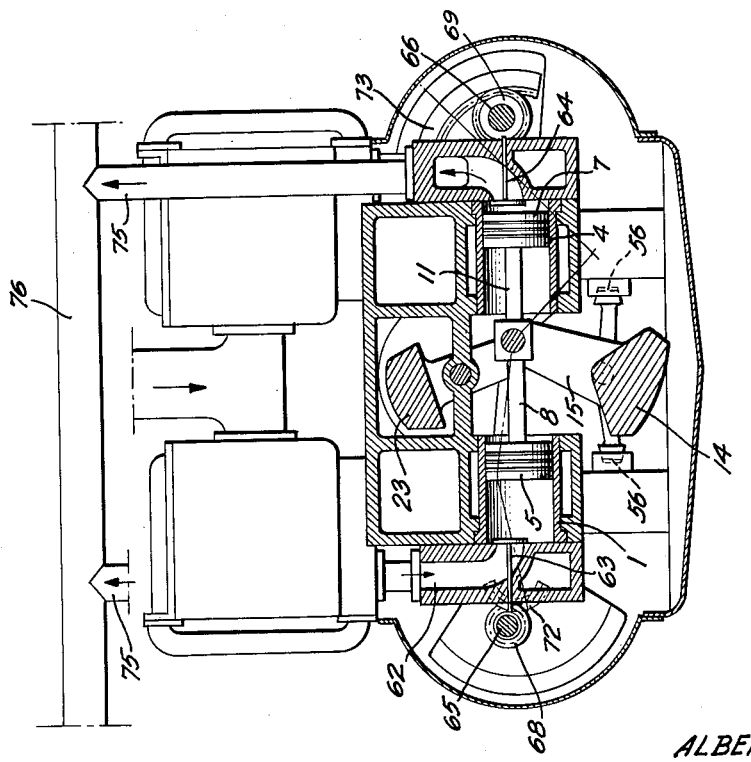
INVENTOR
ALBERT A. DROS
BY Kenyon and Palmer
ATTORNEYS INVENTOR
ALBERT A. DROS
BY Kenwon and Palmer
ATTORNEYS

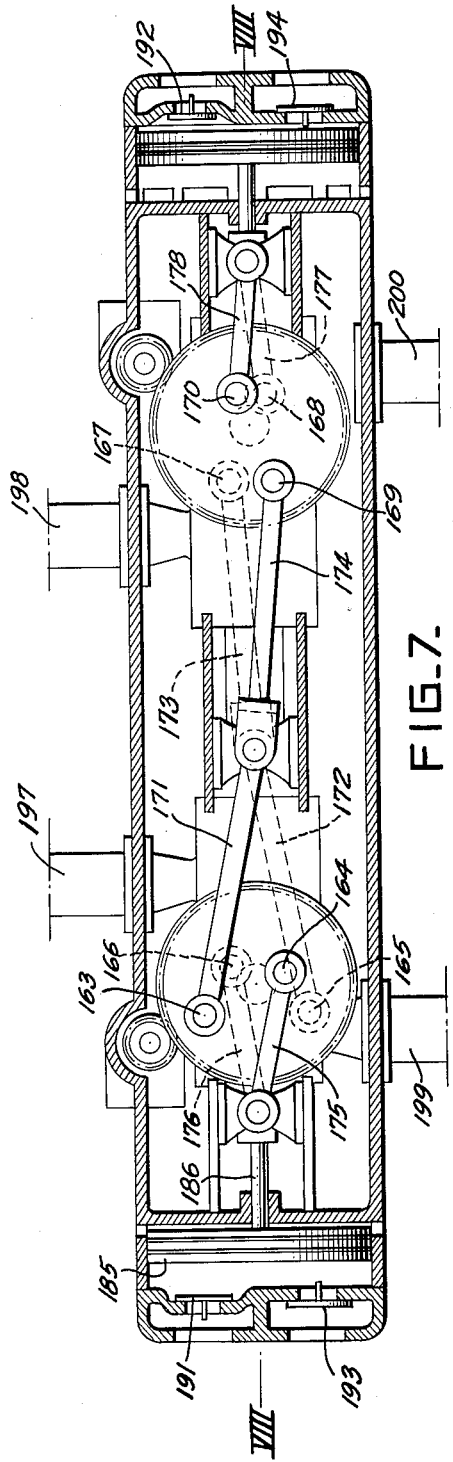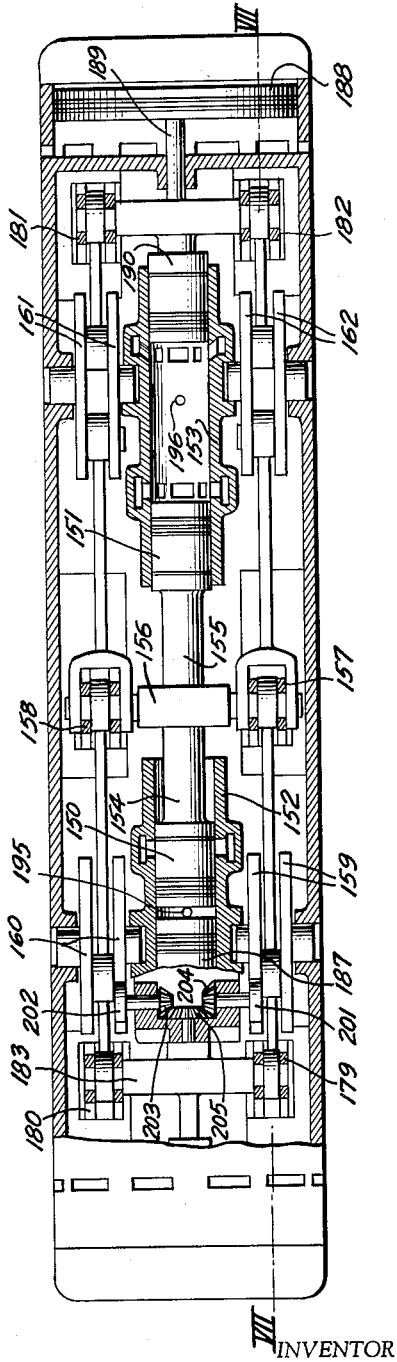

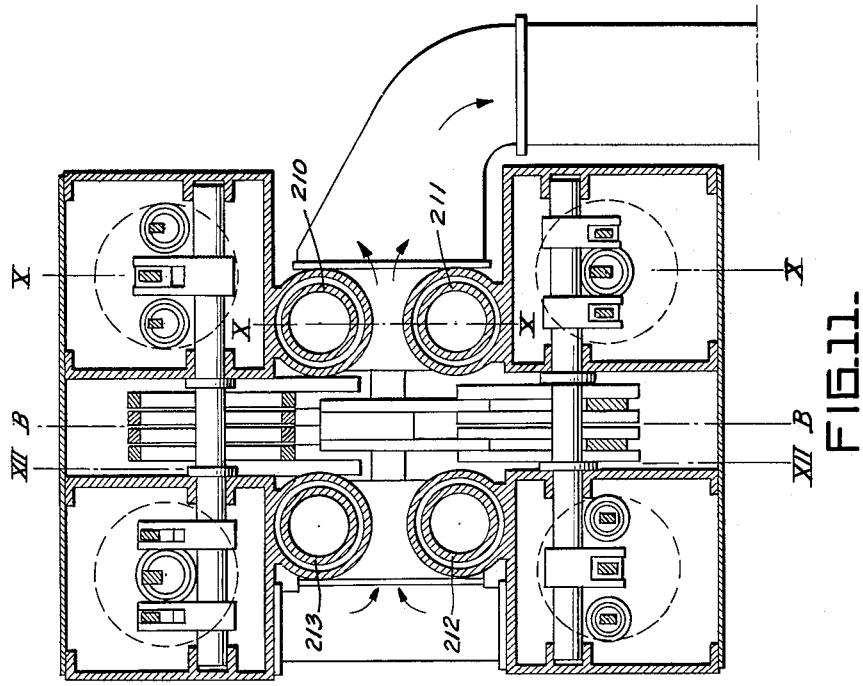
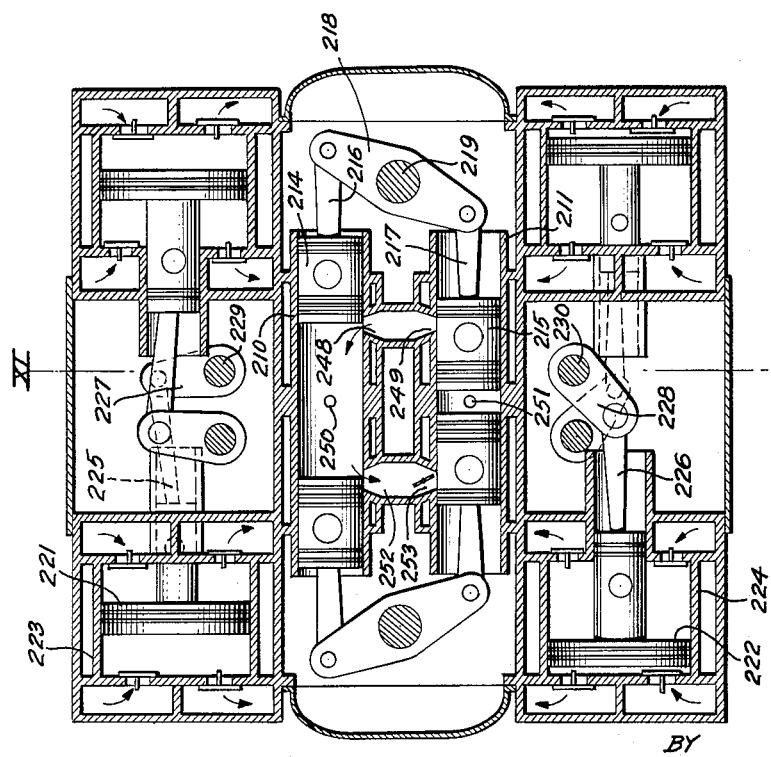

Feb. 28, 1956  A. A. DROS  2,736,488
ENGINE-UNIT CONSISTING OF AT LEAST ONE WORKING
CYLINDER AND AT LEAST ONE COMPRESSOR CYLINDER
Filed Aug. 13, 1952  6 Sheets-Sheet 6
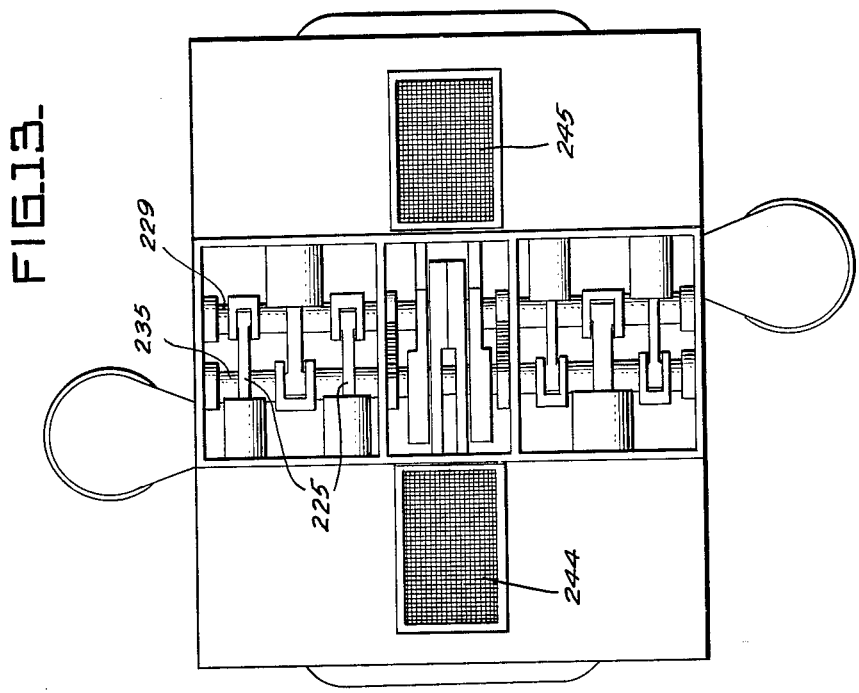
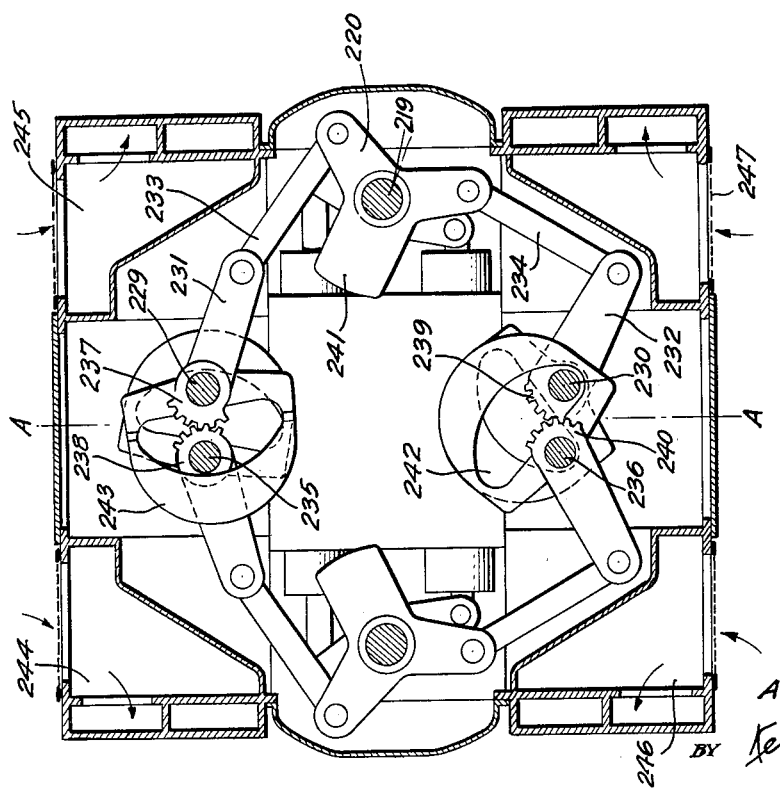
INVENTOR
ALBERT A. DROS
BY Kenron and Palmer
ATTORNEYS

United States Patent Office 2,736,488
Patented Feb. 28, 1956

2,736,488

ENGINE-UNIT CONSISTING OF AT LEAST ONE WORKING CYLINDER AND AT LEAST ONE COMPRESSOR CYLINDER

Albert August Dros, Eindhoven, Netherlands

Application August 13, 1952, Serial No. 304,192

26 Claims. (Cl. 230—56)

The present invention relates to engine-driven compressor units having at least one engine cylinder, at least one compressor cylinder, and driving mechanisms connecting the engine or working piston to the compressor piston.

Such units are known comprising driving mechanisms which consist exclusively of reciprocating parts and which can be subdivided into three or more mass systems, at least one of these systems moving at a frequency twice as high as the frequency of two of the other systems which reciprocate with a constant phase difference between them. Wherever in this specification mention is made of a reciprocating motion, this term is to be understood to mean a rectilinear as well as an oscillating motion.

In the known units, such as described in my patent, No. 2,558,481, dated June 26, 1951, both the working pistons and the compressor pistons are coupled with the systems which reciprocate at the lower or "single" frequency. The mass system moving at the higher or "double" frequency (i. e. at double the frequency of the two other systems) acts exclusively as a connecting member between the systems moving at the single frequency.

These known units offer various advantages. Thanks to the use of the above-mentioned driving mechanism it is possible, for example, to obtain a light and compact construction of the unit and quite a satisfactory balance. Furthermore, the friction of the moving parts may be slight. A drawback of these units, however, is that the forces transmitted via the driving parts are comparatively high, which results in the pivots of the driving mechanism being heavily loaded.

The present invention has for its object to reduce the forces transmitted via the driving parts and to reduce the loads on the pivots of the driving mechanisms by coupling the working pistons with the driving mechanism in a different way. It proves thus to be possible, under otherwise similar circumstances, to achieve a lower load on the driving mechanism than with the known units.

According to the present invention, the unit exhibits the feature that the piston or pistons of the working cylinder or cylinders is or are coupled with that system of moving parts which reciprocates at the higher or double frequency.

If the working cylinders are built as cylinders of internal combustion engines, they may be constructed, as is the case with the known units, so as to operate according to the two-stroke principle. Since, however, the pistons in the working cylinders of the unit according to the invention move at a frequency twice as high as that of other parts of the driving mechanism, it is possible to arrange the working cylinder or cylinders to operate according to the four-stroke principle.

It is generally desirable that piston compressors should be operated with not too high a number of strokes per minute whereas with combustion engines the number of strokes per minute can be raised to a much higher value without any objection. This can be achieved if, according to a further feature of the invention, the piston or pistons of the compressor cylinder or cylinders is or are coupled with at least one of the mass systems moving to and fro at the lower or single frequency.

It is important to choose the correct dimensions for the piston strokes. In known units of the kind described above, the compressor piston is coupled with the driving mechanism in such a way that the stroke is large with respect to the stroke of the mass system moving at the higher or double frequency.

According to a further advantageous feature of the invention, the piston or pistons of the compressor cylinder or cylinders may be coupled with the driving mechanism in such a way that the maximum stroke of a compressor piston is twice the stroke of the piston in the working cylinder and the minimum stroke is half the stroke of the latter piston.

The unit according to the invention preferably is used as a motor-compressor or as a piston-type pressure-gas generator. With a motor-compressor, in which a compressor is driven by a motor, the compressed medium, for example air, may be used for various purposes. A pressure-gas generator is also a unit in which a compressor is driven by a motor, but in this case the compressed air is supplied to the engine cylinders. After addition of fuel this air does work in these cylinders whilst the exhaust gases, which still have a relatively high pressure and temperature, further expand in a gas turbine. According to a further feature of the invention, both the compressor portion and the work portion of the unit should preferably be so dimensioned that the power delivered by the work portion is substantially equal to the power taken up by the compressor portion.

According to an advantageous form of construction embodying the present invention, the driving mechanism consists of two similar portions which are coupled with one another by means of the mass system moving at the higher or double frequency whilst the movements of the systems moving at the lower or single frequency mutually differ in phase by 90°. The two similar portions are located on opposite sides of the mass system which moves at the double frequency and each consists of at least two elements of which one is pivotally connected both to the mass system moving at the double frequency and to the second element, whilst this second element can oscillate about a fixed pivot, the working piston or pistons being coupled with the mass system moving at the double frequency.

Furthermore, it is desirable that the stroke of the mass system reciprocating at the double frequency should be determined by the in line or fully extended positions of those driving parts coupled with the mass system which move with a mutual phase difference of 90°.

Further advantageous forms of construction will be discussed with reference to the accompanying drawings which represent diagrammaitcally a few embodiments of the invention. In these drawings:

Figs. 1, 2, 3 and 4 represent a pressure-gas generator in which the working pistons move in a horizontal direction and the compressor pistons move in the vertical direction.

In Figs. 5 and 6, showing a second embodiment, all the pistons move in the vertical direction, whereas in Figs. 7, 8 and 9, showing a third embodiment, all the pistons move in a horizontal direction and at the double frequency.

In the unit shown in Figs. 10, 11, 12 and 13 all the pistons again move in a horizontal direction.

Figs. 3 and 4 represent cross-sections taken on the line III—III and on the line IV—IV respectively in Fig. 2.

The unit illustrated in Figures 1–4, inclusive, comprises mass systems moving at the double frequency and mass systems moving at the single frequency. The mass systems moving at the double frequency consist in the first place of the pistons in the working cylinders 1, 2, 3 and 4, i. e. the pistons 5, 6, 7, see Figure 2, in the cylinders 1, 2 and 4 and the piston (not shown) in the cylinder 3, Figure 2.

Figure 2:
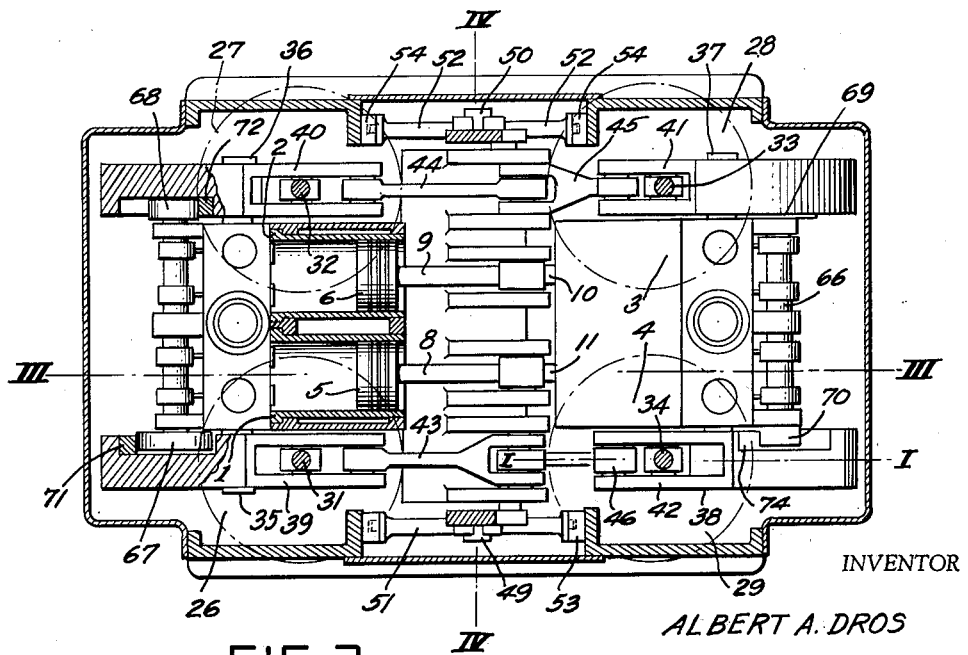
Fig. 2 is a diagrammatic cross-section taken on the line II—II in Fig. 1, the working cylinders being represented in elevation on the left-hand side.

To these higher or double frequency mass systems belong furthermore the piston rods 8, 9, 10 and 11, Figure 2, which are pivotally connected by means of pivots 12 and 13, Figure 4, to arms 15 and 16 of a connecting element 14. To the element 14 are also secured arms 17 and 18. The connecting element 14, which acts as a counterweight, is suspended by means of pivots 19 and 20 from arms 21 and 22 which can oscillate on fixed pivots 24 and 25 and which support a counterweight 23. The above-mentioned counterweights 14, 23 are preferably located on both sides of the direction of movement of the pivots 12, 13 and 19, 20 and oscillate in opposite directions, Figure 4.

The mass systems moving at the single lower or frequency consist of four similar systems of elements. To each of these systems belong in the first place the pistons of the compressor cylinders, viz. of the cylinders 26, 27, 28 and 29, Figures 1 and 2, of which only the piston 30 in the cylinder 29 is shown in Figure 1 in the drawings.

Figure 1:
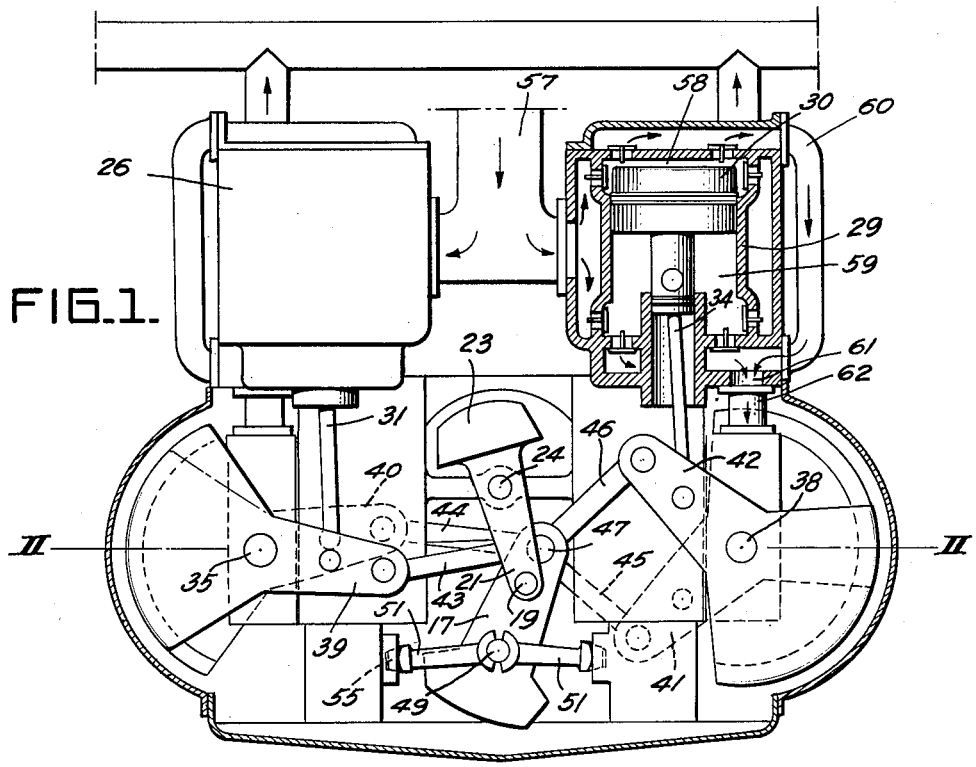
Fig. 1 is a diagrammatic side view of the driving mechanism and shows one compressor cylinder in cross-section on the line I—I in Fig. 2

To each of these lower or single frequency systems belong furthermore the connecting rods 31, 32, 33 and 34, Figures 1 and 2, respectively, which establish the connection between the pistons and elements 39, 40, 41 and 42 respectively which oscillate on fixed pivots 35, 36, 37 and 38 respectively and which also belong to these systems.

The elements 39, 40, 41 and 42 are pivotally linked by means of rods 43, 44, 45 and 46 respectively, to pivots 47 and 48 on the arms 17 and 18 of the connecting element 14 which moves at the double frequency. The pivots 47 and 48 lie in the same centre line as the pivots 12 and 13, Figure 4, of the piston rods 8, 9, 10 and 11.

The pivots 47, 48, 12 and 13, are adapted to move with their common centre line in a plane passing through the centre lines of the working cylinders 1, 2, 3 and 4. They are compelled to move in this plane in consequence of the location of the pivots 19 and 20 on the arms 17 and 18 and by the fact that the pivots 49 and 50, which are secured to the arms 17 and 18, are movable in a vertical plane. These pivots are guided in a straight line by rocking members 51 and 52, Figures 1 and 2, respectively, which have substantially the shape of a sector of a circle the centre of which coincides with the centres of the pivots 49 and 50. These rocking members are adapted to roll on the plane tracks 53 and 54 located on both sides of the pivots 49 and 50, a pure rolling movement being ensured by teeth 55 and 56 respectively provided on the rocking members and on the plane tracks and meshing with each other. The connecting element or counterweight 14 and the counterweight 23 are designed so as to balance substantially the other systems moving at the double frequency. The counterweights 14, 23 perform not only a horizontal movement in the same direction and at the double frequency but also a vertical movement in the opposite direction at four times the single frequency, the vertical inertia force of the counterweight of the connecting element or counterweight 14 predominating however. The difference is utilised to balance those inertia forces of the compressor pistons which are produced in consequence of the finite length of the compressor connecting rods and which also have a four-fold frequency. The elements 39, 40, 41 and 42 are also provided with counterweights by means of which the inertia forces of the systems moving at the single frequency are balanced.

As appears from Fig. 1, which shows the compressor cylinder 29, the compressor is designed so as to be double-acting. The air is supplied through a passage 57 which communicates with the various compressor cylinders. In the space 58 above the piston 30 as well as in the space 59 underneath this piston the air is compressed to about 5 atmospheres absolute. The air compressed in the space 58 flows through the passage 60 and the port 61 and thence to the working cylinder 4. Likewise the air compressed underneath the piston 30 flows through the port 61 into the passage 62.

Each working cylinder is provided with one inlet valve and one outlet valve.

In Fig. 3 only the inlet valve 63 of cylinder 1 and the outlet valve 64 of cylinder 4 are visible. In the cylinders is also an injection nozzle which, however, is not shown. The valves of the working cylinders are controlled by two camshafts 65 and 66. These camshafts, shown in Figs. 2 and 3, determine the periods during which the valves are open or closed. Each of these camshafts 65 and 66 is provided with two toothed wheels 67, 68 and 69, 70 respectively. The wheels 67 and 68 cooperate with the toothed rims 71 and 72 of the elements 39 and 40.

In a similar way the toothed wheels 69 and 70 cooperate with the toothed rims of the elements 41 and 42. Of these toothed rims the toothed rim 73 of the element 41 is shown in Fig. 1 and the toothed rim 74 is shown in Fig. 2. The rims 71 and 73 are toothed internally whereas the rims 72 and 74 are toothed externally. Owing to the co-operation of the gear wheels with the toothed rims, an oscillating movement is imparted to the camshafts. Besides controlling the valves, the camshafts also serve for the mutual synchronization of the mass systems moving at the single frequency with a phase difference of 180°.

The exhaust gases of the working cylinders leave these cylinders through the outlet valves and are carried off by the passages 75 which open into a common conduit 76.

The movements of the mass systems moving at the single frequency, which are located at either side of the mass systems moving at the double frequency (the separating plane being the plane of drawing in Fig. 4), are such that between the movements there exists a phase difference of 90° whereas between the movements of two mass systems moving at the single frequency and located on the same side of this separating plane there exists a phase difference of 180°.

The strokes of the mass system moving at the double frequency are determined by the in line or fully extended positions of the elements moving at single frequency. During the reciprocating movement of the pivots 47 and 48 the elements moving at the single frequency move from one extreme position, such as has almost been reached, for example, by the elements 42 and 46 in Fig. 1, through the in line position almost occupied by the elements 39 and 43 to another extreme position in which the elements 41 and 45 have almost arrived.

The working of the unit is as follows:

With the unit in the position as shown in Figs. 1–4, that is with engine pistons 5 and 6 near the right hand end of their stroke and engine pistons 7 and one not shown, which is opposite and connected to piston 6, near the right hand end of their stroke, compressor piston 30 will be near the top of its stroke, the adjoining compressor piston in cylinder 28 will be near the bottom of its stroke, and the compressor pistons in cylinders 26 and 27 will be near the middle of their strokes moving in opposite directions. With one stroke of the engine pistons and the mass system moving at double frequency, the compressor pistons will only move one-half a stroke and the connecting linkage between the compressor pistons and element 14 has only moved one-half an oscillation. Thus, the engine pistons make two strokes for every stroke of the compressor piston and every oscillation of the connecting linkage. With reference to the mass systems described above, it may be readily seen that one mass system moves at double the frequency of the two other mass systems.

For a more detailed description of the reciprocation of the various mass systems, consider the unit as shown in Figs. 1–4 as the starting point. For the sake of simplicity and clarity only the systems comprising engine piston 6 and connecting rod 9 as the mass system moving at double frequency, the connecting links 42 and 46 as one of the systems moving at single frequency, and the compressor piston 30 and connecting rod 34 as the other mass system moving at single frequency will be described.

As the piston 6 shown in Fig. 2 moves to the right, the linkage 42 and 46 bows upwardly and the angle between links 42 and 46 reaches its minimum as compressor piston 30 reaches top dead center. After the piston 6 reaches the right hand end of its stroke, it starts back to the left. As piston 6 moves left, pivot 47 also moves left and linkage 42 and 46 tends to straighten or form a greater angle between links 42 and 46. Since the piston 30 is connected to link 42, piston 30 will be starting on its down stroke. When piston 6 is all the way to the left, at the end of its stroke, the links 42 and 46 will be stretched to an inline position and the piston 30 will be half way along its down stroke. As the piston 6 again starts to the right, the kinetic energy of the systems will cause the linkage 42 and 46 to bow downwardly as the piston 30 continues its down stroke. When the piston 6 is near the right end of its stroke, the linkage 42 and 46 will be bowed downwardly, similar to the position of the linkage 41 and 45 shown in dotted lines in Fig. 1, and piston 30 will be near the bottom of its stroke. After piston 6 reaches the right hand end of its stroke, it starts left again and the pivot 42a between links 42 and 46 and piston 30 starts up again. When the piston 6 again reaches the left end of its stroke, the links 42 and 46 are in a straight line and piston 30 is half way on its up stroke. When piston 6 again reciprocates to the right, the linkage 42 and 46 is again bowed up as shown in Fig. 1, and piston 30 is at the top of its stroke. It may be seen from the foregoing that piston 6 has made four strokes while piston 30 has made two strokes and linkage 42 and 46 has made two oscillations. Therefore, the frequency of the engine piston mass system is moving at double the frequency of the other two mass systems comprising the compressor piston mass system and the oscillating linkage mass system.

After the engine has been started, for example with the aid of compressed air, air is drawn in by the compressors through the passage 57. The compressed air is supplied to the cylinders 1, 2, 3 and 4 in which, after the addition of fuel, at least part of the air, after being compressed, does work. Together with the remaining air of comparatively low pressure, for example of 4.8 atm. absolute, the combustion gases are carried off through the channels 75 and 76 to a gas turbine where the gases can further expand. In this form of construction the compressor pistons are coupled with the driving mechanism in such a way that the stroke of the compressor pistons is 1.25 times the stroke of the working pistons. However, if desired, a different ratio may be chosen but preferably the minimum stroke of the compressor piston should be half the stroke of the working piston and the maximum stroke should be twice the stroke of the working piston.

Preferably a four-stroke cycle should take place in the working cylinders but the engines may also be built as two-stroke engines.

Figure 5:
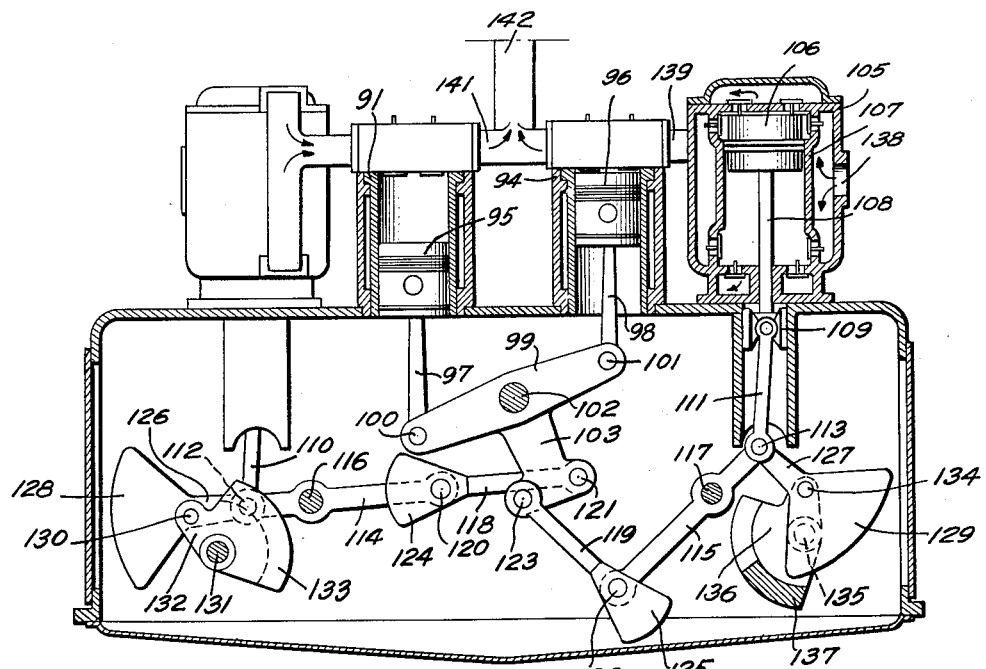
Figure 6:
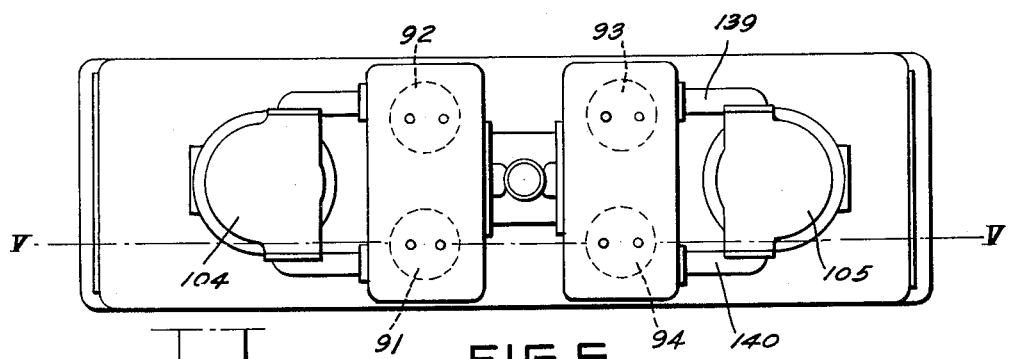

Figs. 5 and 6 represent a different form of construction according to the invention. Fig. 5 is a section on the line V—V in Fig. 6 and shows a sectional view of a compressor cylinder, Fig. 6 being a plan view of the unit. This unit, too, comprises mass systems moving at the double frequency and mass systems moving at the single frequency.

One of the mass systems moving at the double frequency is formed by the pistons in the working cylinders 91, 92, 93 and 94. Fig. 5 shows only the pistons 95 and 96 in the cylinders 91 and 94. To this mass system belong furthermore the connecting rods of which only the rods 97 and 98 corresponding to the pistons 95 and 96 are shown. The four connecting rods are pivotally linked to the rocking lever 99, the points of articulation being marked 100 and 101. The rocking lever 99, which also belongs to this mass system, is adapted to oscillate about the fixed pivot 102 and is provided with an arm 103.

The mass systems moving at the single frequency consist of the pistons in the compressors 104 and 105. Only the compressor 105 is represented in section so that only the piston 106 in the cylinder 107 is shown. To these mass systems belong furthermore the piston rods and cross-heads of which only the piston rod 108 and the cross-head 109 associated with the piston 106 are shown, and the connecting rods 110 and 111. The latter connecting rods are pivotally coupled with the elements 114 and 115 respectively at the points 112 and 113 respectively. The elements 114, 115 can oscillate about fixed pivots 116 and 117 respectively. The mass systems moving at the single frequency are coupled by means of the rods 118 and 119 with the mass system moving at the double frequency. Thus the rod 118 is pivotally coupled with the element 114 at the point 120 and with the arm 103 of the rocking lever 99 at the point 121.

In a similar way the rod 119 is articulated to the corresponding elements at the points 122 and 123.

For balancing the vertically reciprocating compressor pistons the rods 118 and 119 are provided with counterweights 124 and 125. Moreover, the elements 126 and 127, which are provided with counterweights 128 and 129 respectively are pivotally linked to the elements 114 and 115 respectively. In its turn the element 126 is pivotally linked at the point 130 to the element 132 which oscillates on the fixed pivot 131 and which is also provided with a counterweight 133. Similarly the element 127 is coupled at the point 134 with the element 136 which oscillates on the fixed pivot 135 and to which the counterweight 137 is secured. The counterweights 124 and 128 together balance the piston, piston rod, cross-head and connecting rod of the compressor cylinder 104. Similarly, the counterweights 125 and 129 balance the piston, piston rod, cross-head and connecting rod of the compressor cylinder 105. The counterweights 128 and 129 balance, in addition, the forces of inertia in horizontal directions. The counterweights 133 and 137 jointly furnish a moment the direction of which is opposite to that of the moment provided by the working pistons moving at the double frequency and the associated driving parts. The dimensions of the elements should preferably be such that the fixed pivots 102, 116 and 131 lie on a straight line just as the fixed pivots 102, 117 and 135 lie on a straight line whilst the polygon of forces lying between the pivots 102, 123, 122, 117 is similar to the polygon of forces lying between the pivots 135, 134, 113 and 117. The same holds for the polygon of forces lying betweeen the pivots 102, 121, 120, 116 and 131, 130, 12 and 16. It should be noted that it is not essential, as is represented in Fig. 5, that the point of attachment of the connecting rod 110 to the element 114 and the point of attachment of the element 126 to the element 114 coincide.

The compressor 105 is shown in Fig. 5 in cross-section. The compressor is double-acting and comprises a piston 106. The air is sucked in through the port 138 and enters either into the working space above the piston or into the working space beneath the piston. The compressed air leaves the compressor through the passages 139 and 140 and reaches the working cylinders 93 and 94 which are provided with inlet valves and with a fuel valve or atomiser. The same applies to the compressor 104 which provides the air for the working cylinders 91 and 92. The control of these valves is not shown in the figures but, in a similar way as indicated in the unit shown in Figures 1–4, it may be derived from the mass systems moving at the single frequency. The gases, after expansion in the working cylinders, in which a four-stroke cycle takes place, are carried off through the passages 141 and 142, for example, to a gas turbine.

Figure 9:
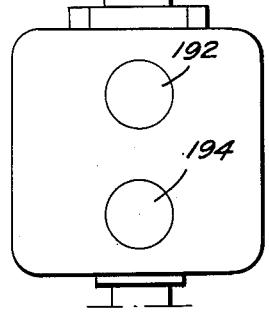

In the example shown in Figs. 7, 8 and 9, two-stroke cycles take place in the working cylinders. The unit illustrated in these figures is a motor-compressor. Fig. 7 is a vertical section taken on the line VII—VII in Fig. 8 and Fig. 8 is a horizontal section on the line VIII—VIII in Fig. 7, in which, however, on the left-hand side a compressor cylinder is represented in elevation and a gear wheel system is shown in section. Fig. 9 is a side-view of the unit.

The unit shown in Figs. 7, 8 and 9 comprises three mass systems moving at the double frequency.

One mass system consists of the pistons 150 and 151 which are movable to and fro in the working cylinders 152 and 153 respectively. This mass system consists furthermore of the piston rods 154 and 155 respectively with a common yoke 156 to which the cross-heads 157 and 158 are attached.

In addition to the three mass systems movable at double frequency, the unit also has four mass systems moving at the single frequency, viz. the twin discs 159, 160, 161 and 162 all of which are adapted to oscillate at the centre on a fixed pivot. Each of the twin discs 159, 160, 161 and 162 is provided with two pivots 163, 164; 165, 166; 167, 168 and 169, 170. Rods 171, 172, 173 and 174 are articulated to the pivots 163, 165, 167 and 169 respectively. The rods 171 and 174 are also pivotally linked to the cross-head 157 and the rods 172 and 173 to the cross-head 158.

With the pivots 164, 166, 168 and 170 are pivotally coupled the rods 175, 176, 177 and 178 which are also coupled with the cross-heads 179, 180, 181 and 182.

The cross-heads 179 and 180 are secured to a common yoke 183 and belong to a second mass system which moves at the double frequency. Likewise the cross-heads 181 and 182 are secured to a yoke 184 and these elements belong to a third system which moves at the double frequency. To the second system belong furthermore the compressor piston 185, the piston rod 186 and the working piston 187 with the associated rod portion.

To the third system belong furthermore the compressor piston 188, the piston rod 189 and the working piston 190.

Between the movements of the mass systems 159 and 162 moving at the single frequency there exists a phase difference of 90°. There also exists a phase difference of 90° between the movements of the mass systems 160 and 161. Between the movements of the mass systems 159 and 160 and between those of the systems 161 and 162 there exists, on the contrary, a phase difference of 180°. The pistons 150 and 187 and the pistons 151 and 190 move at the double frequency and with a phase difference of 180°.

The compressors to which belong the compressor pistons 185 and 188 are single-acting and each comprises an inlet valve (191 and 192 respectively) and an outlet valve (193 and 194 respectively). Fuel is supplied to the working cylinders through atomizers 195 and 196. Scavenging air is supplied to each working cylinder through passages 197 and 198 respectively and the exhaust gases leave the cylinders through passages 199 and 200 respectively.

The movements of the mass systems moving at the single frequency and with a phase difference of 180° are synchronized by means of toothed gearing. One of the two discs of each of the systems 159, 160, 161 and 162 respectively is provided with a toothed rim in mesh (as may be seen on the left-hand side of Figs. 7 and 8 for the discs 159 and 160) with the gear wheels 201 and 202 respectively. The gear wheels are coupled with the crown wheels 203 and 204 which in turn are in mesh with the crown wheel 205. A similar mechanism is visible on the right-hand side of the drawing.

The unit represented in Figs. 10, 11, 12 and 13 is a different form of construction according to the invention.

Figs. 10 and 11 are vertical sections on the line X—X in Fig. 11 and on the line XI—XI in Fig. 10 respectively.

Fig. 12 is a horizontal section on the line XII—XII in Fig. 11 and Fig. 13 is a plan view of the set, the plate covering the driving mechanism being removed.

The compressed-gas generator represented in Figs. 10 to 13 has several planes of symmetry. The plane passing through the line A—A at right angles to the paper in Fig. 12 is a plane of symmetry for the driving mechanism, except for the compressor cranks. The plane passing through the line B—B in Fig. 11 is also a plane of symmetry for the driving mechanism, except for the compressor cranks. Furthermore, the whole of the machine, the compressor cranks included, is centro-symmetric with respect to the intersecting line of the planes passing through the lines A—A and B—B. In connection with the above-mentioned symmetries substantially only that portion of the unit will be described hereinafter which is represented in the right-hand half of Figs. 10 and 12.

The unit comprises in all four engine cylinders 210, 211, 212 and 213 each of which comprises two oppositely acting pistons of which one belongs to the left-hand half and the other to the right-hand half of the machine. In each of the engine cylinders a two-stroke cycle takes place with uni-directional scavenging, the inlet ports of each cylinder being opened by the one piston and the outlet ports by the other. The engine cylinders are arranged in such a manner that the points of intersection of the parallel centre lines of the cylinders with a plane at right angles to these lines form the corners of a rectangle.

To the mass system moving at the double frequency belong the pistons 214 and 215 which are pivotally coupled, by means of the connecting rods 216 and 217, with the rocker 218 which also belongs to this mass system. The rocker 218 is supported by the frame through the intermediary of the shaft 219. The same shaft has attached to it a second rocker with which the pistons in the cylinders 212 and 213 are coupled. To this mass system belongs furthermore the third rocker 220.

To the two mass systems moving at the single frequency belong the double-acting compressor pistons 221 and 222 in the compressor cylinders 223 and 224 respectively. In all there are eight compressor cylinders the pistons of which belong in pairs to the same mass system.

To the above-mentioned mass systems belong furthermore the connecting rods 225 and 226 respectively and the cranks 227 and 228 respectively, the latter being coupled with the shafts 229 and 230 respectively. As is shown in Fig. 12, these shafts have also mounted on them the elements 231 and 232 belonging to the mass systems. Both mass systems, which move relatively to one another with a phase difference of 90°, are articulatedly coupled with the rocker 220 by means of the rods 233 and 234.

A similar driving mechanism is represented on the left-hand side of Figs. 10 and 12. Between the movements of the mass systems coupled with the shafts 235 and 236 there exists a mutual phase difference of 90° whereas a phase difference of 180° exists between the movements of the mass systems associated with the shafts 235 and 229. Likewise, there is a phase difference of 180° between the movements of the mass systems coupled with the shafts 236 and 230.

For the purpose of synchronizing these movements the toothed rims 237 and 238 are provided, the toothed rims 239 and 240 being also in mesh with one another.

For the sake of balance counterweights are provided, for example, the counterweight 241 on the rocker 220 and the counterweights 242 and 243 associated with the elements 232 and 231 respectively.

As is indicated in Fig. 12, the air to be compressed is drawn in through the apertures 244, 245, 246 and 247 and after being compressed it flows from the compressor cylinders through a system of passages to the working cylinders. For this purpose scavenging ports 248 and 249 are provided in the cylinders, as is indicated in Fig. 10 for the cylinders 210 and 211. In each cylinder there is a device for the supply of fuel, these devices being denoted for the cylinders 210 and 211 by the reference numerals 250 and 251. The exhaust gases, which deliver their energy to a turbine, leave the cylinders through the outlet ports 252 and 253.

In the forms of construction described hereinbefore by way of example the working pistons are coupled with a part of the driving mechanism which moves at the double frequency. It is alternatively possible to couple the working pistons with a driving part which reciprocates at a four-fold or still higher frequency. A part moving at the four-fold frequency is, for example, the pivot 49 in Fig. 1.

What I claim is:

1. An engine-driven compressor unit comprising in combination, a piston type engine, a piston type compressor, and a driving mechanism connecting an engine piston with a compressor piston to maintain constant the strokes and the phase relationship of said pistons, said driving mechanism including three systems of movable elements, one system being movable at a frequency double that of the other two systems and being mechanically coupled to said other two systems, said engine piston being a part of said system movable at said double frequency and all of said systems consisting solely of reciprocating elements.

2. In an engine-driven compressor unit as defined in claim 1, said driving mechanism including pivotally connected and supported linkages, and the stroke of said system of elements movable at the double frequency being determined by the length of said linkages in an alined position.

3. In an engine-driven compressor unit as defined in claim 1, the axis of movement of said compressor piston being in a plane substantially perpendicular to the plane of movement of said engine piston.

4. In an engine-driven compressor unit as defined in claim 1, inlet and outlet valves for said piston type engine, and valve lifters operatively connected with said system of elements movable at the single frequency.

5. In an engine-driven compressor unit as defined in claim 1, said engine and said compressor having pistons reciprocable upon parallel axes.

6. In an engine-driven compressor unit as defined in claim 1, said system movable at the double frequency comprising a member oscillatable on a fixed pivot and having engine pistons pivotally connected to the ends of said member.

7. In an engine-driven compressor unit as defined in claim 1, said system movable at the double frequency comprising a member oscillatable on a fixed pivot, rods connecting said member with said engine pistons, and links connecting said member with pivotally supported links connected to said compressor pistons.

8. In an engine-driven compressor unit as defined in claim 1, said systems movable at the single frequency each comprising a first link pivotally supported at a point intermediate its length, a second link connecting one end of said first link to an oscillatable member of said double frequency system, a connecting rod pivotally secured to the other end of said first link and to a crosshead for said compressor piston.

9. In an engine-driven compressor unit as defined in claim 1, said systems movable at the single frequency each comprising a first link pivotally supported at a point intermediate its length, a second link connecting one end of said first link to an oscillatable member of said double frequency system, a connecting rod pivotally secured to the other end of said first link and to a crosshead for said compressor piston, a member pivotally connected to said other end of said first link and pivotally connected to a second member pivotally supported for oscillation at said double frequency.

10. An engine-driven compressor unit comprising in combination, a piston type engine, a piston type compressor, and a driving mechanism connecting an engine piston with a compressor piston to maintain constant the strokes and the phase relationship of said pistons, said driving mechanism including three systems of movable elements, one system being movable at a frequency double that of the other two systems and being mechanically coupled to said other two systems, said compressor piston being a part of one of said two systems movable at a frequency less than the frequency of said first-mentioned system and all of said systems consisting solely of reciprocating elements.

11. An engine-driven compressor unit comprising in combination, a piston type engine, a piston type compressor, and a driving mechanism connecting an engine piston with a compressor piston to maintain constant the strokes and the phase relationship of said pistons, the stroke of said compressor piston being at most twice the stroke of said engine piston, said driving mechanism including three systems of movable elements, one system being movable at a frequency double that of the other two systems and being mechanically coupled to said other two systems, said engine piston being a part of said system movable at said double frequency and all of said systems consisting solely of reciprocating elements.

12. An engine-driven compressor unit comprising in combination, a piston type engine, a piston type compressor, and a driving mechanism connecting an engine piston with a compressor piston to maintain constant the strokes and the phase relationship of said pistons, said driving mechanism including three systems of movable elements, one system being movable at a frequency double the frequency of movement of each of the other two systems, the movement of one of said other two systems being ninety degrees out of phase with the movement of the other of said other two systems of movable elements, each of said other two systems including two elements of which one element is connected to said first-mentioned system and connected to the other element, and said other element is oscillatable about a fixed point, said engine piston being a part of said first-mentioned system movable at said double frequency.

13. An engine-driven compressor unit comprising in combination, a piston type engine, a piston type compressor, and a driving mechanism connecting an engine piston with two compressor pistons to maintain constant the strokes and the phase relationship of said pistons, said driving mechanism including three systems of movable elements, the first of said systems being movable at a frequency double that of the second and third systems and being mechanically coupled to said second and third systems, said second and third systems each including two links pivotally connected together, one of said two links being oscillatable on a fixed pivot and the other of said links being pivotally connected to said first-mentioned system, the two links of said second system being in line when the two links of said third system are out of line, and connecting rods extending between said one of said two links and compressor pistons.

14. An engine-driven compressor unit comprising in combination, a four cylinder piston type engine, a four cylinder piston type compressor, and a driving mechanism connecting said engine pistons with said compressor pistons to maintain constant the strokes and the phase relationships of said pistons, said driving mechanism including a plurality of systems of movable elements, the first of said systems being movable at a frequency double that of the other systems and being mechanically coupled to said other systems, said first system including said engine pistons, piston rods, and an oscillatable member connected to said rods, said second and third systems each including a pair of pivotally connected links for each compressor piston, one link of each pair having a pivotal support and being connected to a compressor piston and to the second link of said pair, said second link of each pair being pivotally connected to said oscillatable member, each of said pair of links having its links out of line at the ends of the compressor piston stroke and in line at an intermediate point of the piston stroke.

15. In an engine-driven compressor unit as defined in claim 14, the pair of links for one compressor piston being in line when the pair of links for an adjacent compressor piston are out of line.

16. In an engine-driven compressor unit as defined in claim 14, said oscillatable member and pivotally supported links having counterweight members associated therewith.

17. In an engine-driven compressor unit as defined in claim 14, inlet and outlet valves for each of said engine cylinders, and valve lifters therefor operatively connected with said one pivotally-supported link of each of said pairs of links movable at single frequency.

18. In an engine-driven compressor unit as defined in claim 14, inlet and outlet valves for each of said engine cylinders, valve lifters therefor, and a cam shaft for said valve lifters and gear-connected to said one pivotally-supported link of each of said pairs of links movable at single frequency.

19. An engine-driven compressor unit comprising in combination, a piston type engine, a piston type compressor, said engine pistons and said compressor pistons being axially alined, and a driving mechanism connecting engine pistons and connecting compressor pistons to maintain constant the strokes and phase relationships of said pistons, said driving mechanism including a plurality of systems of movable elements, two systems being movable at a frequency double that of other systems of movable elements and being movable with a phase difference of one hundred and eighty degrees.

20. An engine-driven compressor unit comprising in combination, a piston type eight cylinder engine, a piston type eight cylinder compressor, said engine cylinders being arranged in opposed pairs, pistons in said cylinders, a driving mechanism connecting said engine pistons with said compressor pistons to maintain constant the strokes and phase relationships of said pistons, said driving mechanisms including a plurality of systems of oscillatable elements, systems connected with said engine pistons being oscillatable at a frequency double that of systems connected with said compressor pistons.

References Cited in the file of this patent

UNITED STATES PATENTS 2,558,481    Dros   ---------------- June 26, 1951

FOREIGN PATENTS 698,312    Germany   -------------- Oct. 3, 1940